(12) United States Patent
Mickael

(10) Patent No.: US 8,194,497 B2
(45) Date of Patent: Jun. 5, 2012

(54) REDUCTION OF TOOL ECCENTRICITY EFFECTS ON ACOUSTIC MEASUREMENTS

(75) Inventor: Medhat W. Mickael, Sugar Land, TX (US)

(73) Assignee: Precision Energy Services, Inc., Fort Worth, TX (US)

(*) Notice: Subject to any disclaimer, the term of this patent is extended or adjusted under 35 U.S.C. 154(b) by 1029 days.

(21) Appl. No.: 11/623,341

(22) Filed: Jan. 16, 2007

(65) Prior Publication Data

US 2008/0170466 A1    Jul. 17, 2008

(51) Int. Cl.
*G01V 1/00* (2006.01)
(52) U.S. Cl. ......... 367/35; 367/86; 367/104; 340/853.6; 340/853.8
(58) Field of Classification Search .............. 340/853.6, 340/853.8; 367/35, 86, 104
See application file for complete search history.

(56) References Cited

U.S. PATENT DOCUMENTS

| | | | | |
|---|---|---|---|---|
| 4,964,085 | A * | 10/1990 | Coope et al. | 367/35 |
| 5,058,077 | A * | 10/1991 | Twist | 367/25 |
| 5,130,950 | A * | 7/1992 | Orban et al. | 367/34 |
| 5,469,736 | A * | 11/1995 | Moake | 73/152.58 |
| 5,486,695 | A | 1/1996 | Schultz | |
| 5,513,528 | A * | 5/1996 | Holenka et al. | 73/152.03 |
| 5,726,951 | A | 3/1998 | Birchak | |
| 6,038,513 | A * | 3/2000 | Varsamis et al. | 702/6 |
| 6,483,777 | B1 * | 11/2002 | Zeroug | 367/35 |
| 6,584,837 | B2 * | 7/2003 | Kurkoski | 73/152.02 |
| 6,648,083 | B2 * | 11/2003 | Evans et al. | 175/41 |
| 6,891,777 | B2 * | 5/2005 | Pabon et al. | 367/27 |
| 7,260,477 | B2 * | 8/2007 | Haugland | 702/6 |
| 2004/0113626 | A1 * | 6/2004 | Wang et al. | 324/339 |
| 2005/0083161 | A1 * | 4/2005 | Minerbo et al. | 336/132 |
| 2005/0185510 | A1 * | 8/2005 | Haugland | 367/57 |
| 2005/0259512 | A1 * | 11/2005 | Mandal | 367/10 |
| 2006/0096105 | A1 * | 5/2006 | Haugland | 33/304 |
| 2006/0106542 | A1 * | 5/2006 | Haugland | 702/14 |
| 2006/0248735 | A1 * | 11/2006 | Haugland | 33/304 |

FOREIGN PATENT DOCUMENTS

GB    2 249 170 A    4/1992

OTHER PUBLICATIONS

UK Search Report received in corresponding application No. GB0725195.2 dated Apr. 11, 2008.

* cited by examiner

*Primary Examiner* — Jack W Keith
(74) *Attorney, Agent, or Firm* — Wong, Cabello, Lutsch, Rutherford & Brucculeri, L.L.P.

(57) ABSTRACT

A system for measuring an acoustic property of material penetrated by a well borehole. The system uses a borehole logging tool comprising preferably one acoustic transmitter and preferably a plurality of acoustic receivers. An independent measurement is used to determine azimuthal orientation of the tool within the borehole. Firings of the transmitter are based upon azimuthal orientation of the tool. Receiver responses resulting from preferably a plurality of transmitter firings per tool revolution are combined to form at least one composite transmitter response. The composite receiver response is compensated for adverse effects of the tool operating eccentered within the borehole.

26 Claims, 6 Drawing Sheets

REDUCTION OF TOOL ECCENTRICITY EFFECTS ON ACOUSTIC MEASUREMENTS

FIELD OF THE INVENTION

This invention is related to systems for measuring an acoustic property of material penetrated by a well borehole. More particularly, the invention is related to compensation for adverse effects of borehole instrument eccentricity upon the measurement. Eccentricity compensation is based upon a plurality of measurements made at known azimuthal orientations. Basic concepts of the invention are applicable to other types of measurements that are adversely affected by tool eccentricity within the borehole.

BACKGROUND

Acoustic logging systems are routinely used in the oil and gas industry to measure formation acoustic properties of earth formation penetrated by a well borehole. These properties include the compressional and shear velocities of the formation, which are subsequently used to determine a variety of formation parameters of interest such as porosity and pore pressure. Additionally, acoustic logging systems are used to produce acoustic images of the borehole from which well conditions and other geological features can be investigated. Other applications of acoustic logging measurements include seismic correlation and rock mechanic determination.

The downhole instrument or borehole "tool" of an acoustic logging system typically comprises one or more sources of acoustic energy or "transmitters", and one or more acoustic receivers. The transmitters and receivers are typically spaced axially on the body of the tool. A portion of the energy emitted by the one or more transmitters propagates through formation material surrounding the borehole, and is subsequently detected by the one or more receivers. Receiver response is then used to determine properties and parameters of interest.

A plurality of receivers can be azimuthally disposed at a given axial spacing thereby forming an "array" of receivers at that axial spacing. Depending on the type of measurement, each array may contain one or more azimuthally spaced receivers. Monopole measurements can be made with an array comprising one receiver. Dipole measurements require an array comprising at least two receivers.

Acoustic tools are required to be centered or "centralized" within the borehole to minimize the effect of tool standoff from the borehole wall. If the tool is decentralized or "eccentered" within the borehole, the acoustic waves traveling along the path of the short borehole distance arrive at the receivers sooner than those traveling along the long borehole path. This creates waveform smearing and distortion resulting in loss of coherence and poor data quality. Poor data quality is propagated to poor measures of formation properties or other parameters of interest In wireline tools, acoustic receivers are typically disposed in the center of the tool and the tool is centralized in the borehole using mechanical centralizers. This arrangement effectively centralizes the receivers within the borehole which, in turn, tends to minimize adverse standoff effect on acoustic measurements in any borehole size in which tool centralization can be maintained.

In logging-while-drilling (LWD) tools, acoustic receivers are typically disposed on or near the perimeter of the tool, and the tool is preferably centralized within the borehole using wear bands that are slightly larger than the tool diameter. These fixed-diameter wear bands can only centralize the tool in certain borehole sizes. In different borehole sizes, which is common in drilling operations, eccentricity effects on acoustic LWD tool response can be severe.

Other techniques are used to minimize effects of tool eccentricity, especially in boreholes of varying diameter or in boreholes with irregular cross sections. One technique uses two receiver arrays, with the two receivers being azimuthally spaced at 180 degrees. Responses of the two receivers are averaged, or alternately summed, thereby yielding a composite signal with reduced adverse tool eccentricity effects. Another technique utilizes four azimuthally spaced receivers in each array, wherein the responses of the four receivers are again combined forming a composite signal with further reduce tool eccentricity effects. Manufacturing costs and operational reliability of tools comprising multiple receiver arrays at each axial spacing are considerably greater than tools comprising single receiver "arrays".

Another system embodied to reducing tool eccentricity effects comprises a plurality of single acoustic receiver arrays combined with an ultrasonic transducer or "pinger". The pinger measures the standoff of the tool as it rotates within the borehole. If the tool is equipped with at least three ultrasonic pingers, measures of borehole diameter and tool standoff can be made. Given these two measurements, the acoustic measurement can be made when the pinger system senses that the tool is centered in the borehole. Ultrasonic pingers add to the cost of the tool and introduce additional operational and reliability issues. Furthermore, the ultrasonic measurement quality is a function of borehole conditions including type of fluid filling the borehole. Unexpected changes in these borehole conditions, which are operationally common, can introduce errors in the eccentricity correction of the sensor responses.

SUMMARY

The invention is an acoustic LWD logging tool comprising preferably one acoustic transmitter and preferably a plurality of acoustic receivers. A single receiver is disposed on or near the periphery of the tool at preferably a plurality of axial spacings. In terminology of the art, one or more receivers disposed at a given axial spacing comprise an "array" at that spacing. Again using terminology of the art, each receiver "array" in the tool disclosed herein comprises a single receiver.

For purposes of discussion, it will be assumed that the tool comprises a single transmitter. An independent measurement is used to determine azimuthal orientation of the tool within the borehole as the tool is rotated by the drill string. The independent measurement can be a measure of azimuthal angle or a measure of time. Firings of the transmitter are based upon azimuthal orientation of the tool face. More specifically, the transmitter is fired when the tool face is oriented in a first azimutal angle, and a first set of responses from the plurality of axially spaced receivers is made with the tool oriented at the first azimuthal angle. The transmitter is again fired a second time when the tool face is azimuthally oriented preferably 180 degrees from the first angle, and a second set of responses from the plurality of axially spaced receivers is made with the tool oriented at this second azimuthal angle. First and second responses are averaged, or alternately summed, for each axially spaced receiver thereby forming a composite response for that receiver. The process is repeated as the tool is conveyed along the borehole. In effect, the averaging or sum of the first and second measurements for each receiver resembles the response that would be obtained if the tool were centralized within the borehole. This averaging or summing operation reduces or "compensates" for adverse effects of tool eccentricity at each axially receiver spacing, and requires the use of only a single receiver at each spacing.

Tool face orientation measurements are preferably made using a magnetometer or an accelerometer. The measurements are made rapidly with respect to the rotational rate of the tool. The tool firmware controls the source firing and receives the tool face orientation data periodically. At the beginning of a predefined sampling period, the firmware fires the transmitter, captures a set of preferably full wave receiver responses induced by the firing, and determines a first tool face orientation at that time. The firmware then waits until it receives a second tool face orientation measurement that is azimuthally spaced 180 degrees from the first tool face measurement, fires the transmitter again, and captures a second set of receiver responses induced by the second firing. First and second full wave responses for each axially spaced receiver thereby forming a composite full wave response for that receiver. The compensated full wave form responses from the plurality of receivers are then combined using methodology known in the art to obtain one or more measures of formation or other borehole environs, preferably as a function of depth along the borehole.

BRIEF DESCRIPTION OF THE DRAWINGS

The manner in which the above recited features and advantages, briefly summarized above, are obtained can be understood in detail by reference to the embodiments illustrated in the appended drawings.

DESCRIPTION OF THE PREFERRED EMBODIMENTS

The invention will be disclosed as a LWD acoustic logging system. Other means for tool conveyance can be used, as will be discussed in a subsequent section of this disclosure. The disclosure includes a section describing hardware for the preferred embodiment, a section describing the basic concepts for reducing adverse effects of tool eccentricity for the preferred embodiment, a section presenting typical operating results obtained with the system operating in the preferred embodiment, and a section disclosing alternate embodiments of the system.

Hardware

Figure 1:
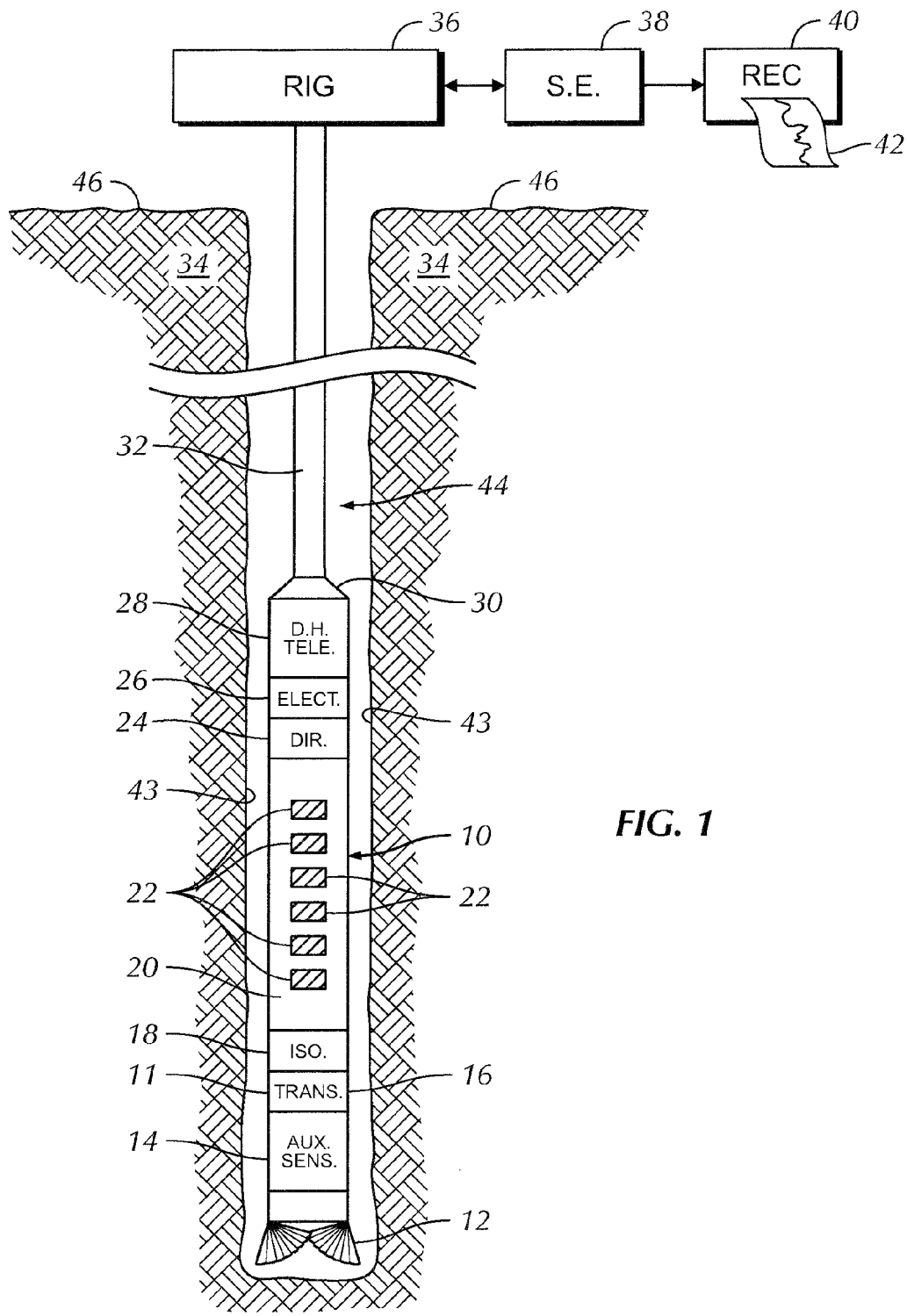
FIG. 1 illustrates the invention embodied as an LWD acoustic system disposed in a borehole drilling environment.

FIG. 1 illustrates the invention embodied as an LWD acoustic system disposed in a borehole drilling environment. The LWD borehole instrument or "tool" component of the borehole assembly is designated as a whole by the numeral 10, and comprises a pressure housing 11 which is typically a drill collar. The tool 10 is disposed within a well borehole 44 defined by borehole walls 43 and penetrating earth formation 34. A drill bit 12 terminates a lower end of the tool 10, and a connector 30 terminates an upper end of the tool. The connector 30 operationally connects the tool 10 to a lower end of a drill string 32. The upper end of the drill string terminates at a rotary drilling rig 36, which is known in the art and is illustrated conceptually at 36.

Again referring to FIG. 1, the tool 10 comprises a transmitter 16 and a receiver assembly 20. An acoustic isolation section 18 separates the transmitter 16 from the receiver assembly 20. The receiver section 20 comprises a plurality of receivers 22 axially spaced from the transmitter 16. Six receivers are illustrated for purposes of discussion, although more or fewer receivers can be used. The receivers 22 are also shown axially aligned, although axial alignment is not required if the transmitter firing sequence is suitably adjusted, as will become apparent in subsequent sections of this disclosure.

As stated previously, an independent measurement is used to determine azimuthal orientation of the tool within the borehole as the tool is rotated by the drill string. The independent measurement can be a measure of azimuthal angle or a measure of time for a given rotational speed. In the embodiment shown in FIG. 1, the tool comprises a directional section 24 that provides a real time measure of azimuthal angle therefore provides azimuthal orientation of the tool 10 within the borehole 44. The directional section 24 can comprise magnetometers, accelerometers, or both magnetometers and accelerometers. The tool 10 can optionally comprise an auxiliary sensor section 14 with one or more auxiliary sensors responsive to a variety of borehole environs parameters. It should be understood that the acoustic measurement system disclosed herein does not require measurements from the auxiliary sensor section 14. An electronics section 26 provides power and control circuitry for the acoustic transmitter 16, receiver elements 22 of the receiver section 20, the directional section 24, and any auxiliary sensors in the auxiliary sensor section 14. Power is typically supplied by batteries, but may be supplied by a mud powered turbine generator (not shown).

Once again referring to FIG. 1, a down-hole processor unit (not shown) is preferably located within the electronics section 26. The processor receives and processes responses from the receiver elements 22. The processor also controls, among other things, the firing of the transmitter 16 as a function of information received from the directional section 24. The electronics section 26 is operationally connected to a down-hole telemetry unit 28. Data, from elements within the tool 10, whether processed downhole as parameters of interest or in the form of "raw" data, are telemetered to the surface 46 of the earth by means of a suitable telemetry system. Suitable telemetry systems include a mud pulse system, and electro-magnetic telemetry system, or an acoustic telemetry system that uses the drill string 32 as a data conduit. The telemetered data are received by an up-hole telemetry element (not shown) preferably disposed in a surface equipment module 38. As the borehole assembly comprising the logging tool 10 is conveyed along the borehole 44 by the drill string 32, one or more parameter of interest, or alternately raw data, are input to a recorder 40. The recorder 40 tabulates the data as a function of depth within the borehole 44 at which they are measured. The recorder output 42 is typically a "log" of the data as a function of borehole depth. The data can alternately be recorded in down-hole processor memory (not shown), and subsequently downloaded to the surface equipment module 38 when the tool 10 is returned to the surface 46 during or after the drilling operation is completed. The downloaded data are typically processed further within the surface equipment module 38 to obtain additional parameters of interest that cannot be determined in the down-hole processor unit.

As stated previously, the pressure housing 11 is typically a steel drill collar with a conduit through which drilling fluid flows. Elements of the tool 10 illustrated conceptually in FIG. 1 are typically disposed within the wall of the drill collar pressure housing 11.

Basic Concepts

The following discussion of basic concepts of the acoustic logging system is applicable to the preferred embodiment of the system. Other embodiments and related concepts will be discussed in a subsequent section of this disclosure.

Figure 2A:
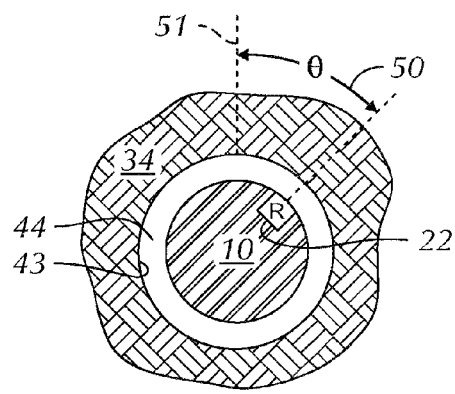
FIG. 2a is a cross sectional view of the tool 10 centered within the bore.
Figure 2B:
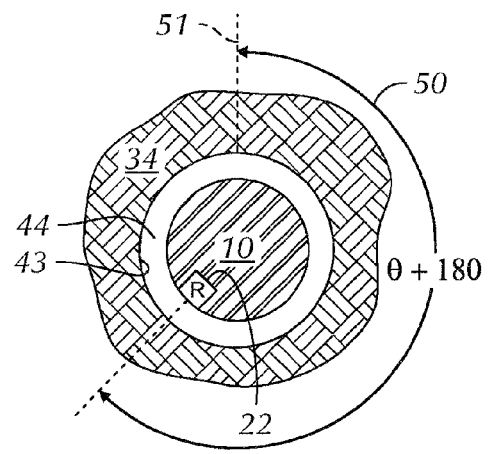
FIG. 2b is a cross sectional view of the tool 10 again centered within the borehole but with a different receiver azimuthal orientation.
Figure 4A:
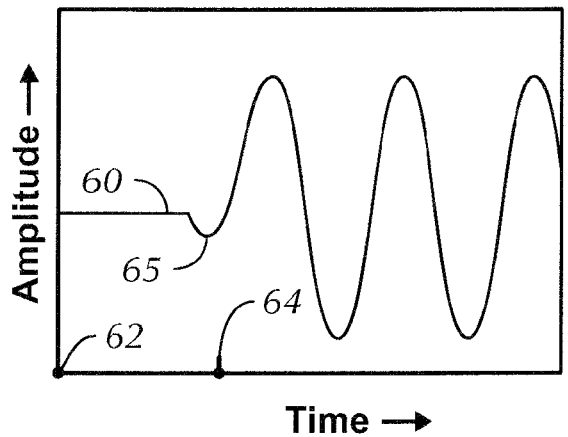
FIG. 4a represents conceptually a full waveform response measured by a receiver with the tool centered within the borehole.

FIG. 2a is a cross sectional view of the tool 10 centered within the borehole 44 defined by the borehole wall 43 and penetrating earth formation 34. The receiver 22 is azimuthally positioned at an angle of θ degrees, identified as 50 and measured with respect to a reference azimuth 51. With the receiver and tool positioned as shown in FIG. 2a, the transmitter 16 (see FIG. 1) is fired a first time. FIG. 4a represents conceptually a resulting full waveform response 60 of the receiver 22 to the firing of the transmitter 16, where the waveform is a plot of amplitude (ordinate) versus time (abscissa). Transmitter firing occurs at time 62. A first negative reflection 65 is recorded at a time 64. FIG. 2b is a cross sectional view of the tool 10 again centered within the borehole 44. The tool 10 has been rotated 180 degrees so that the receiver 22 is now azimuthally positioned at an angle θ+180 degrees measured with respect to the reference azimuth 51. With the receiver and tool positioned as shown in FIG. 2b, the transmitter 16 is fired a second time. Assuming that the formation 34 is azimuthally homogeneous, FIG. 4a again represents conceptually a resulting full waveform response 60 of the receiver 22 to this second firing of the transmitter 16. The waveforms resulting from the first and second transmitter firings are conceptually the same since the tool is 10 is centered within the borehole 44 and the formation 34 is assumed to be azimuthally homogeneous.

Figure 3A:
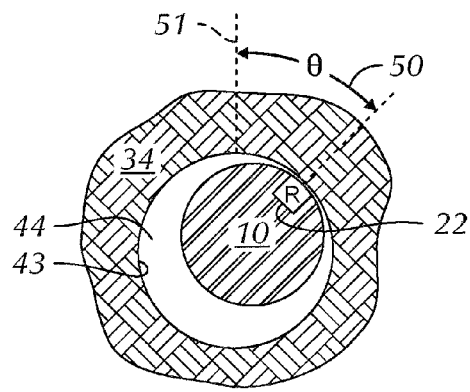
FIG. 3a is a cross sectional view of the tool 10 eccentered within the borehole.
Figure 3B:
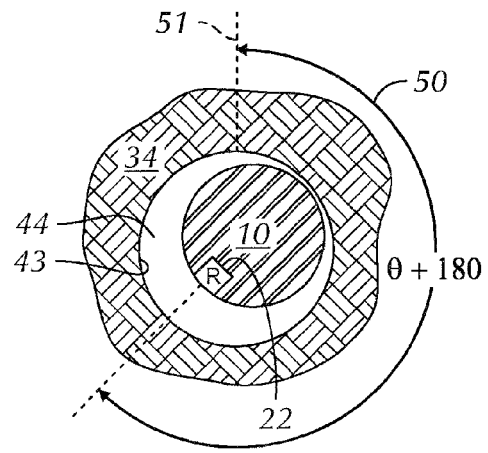
FIG. 3b is a cross sectional view of the tool 10 eccentered within the borehole but with the receiver at a different azimuthal orientation.
Figure 4B:
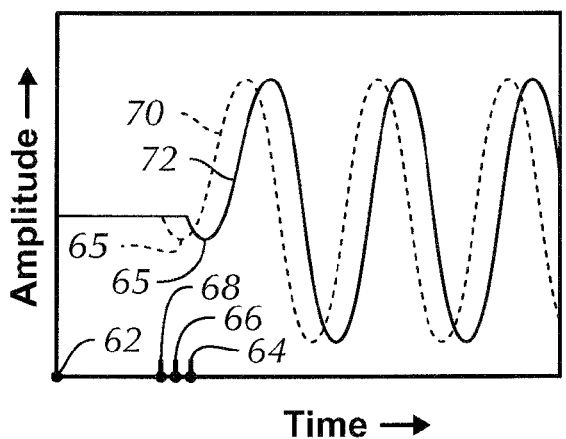
FIG. 4b represents conceptually full waveforms responses measured by a receiver at two azimuthal orientations with the tool eccentered in the borehole.

FIG. 3a is a cross sectional view of the tool 10 eccentered within the borehole 44. The receiver 22 is again azimuthally positioned at the angle θ degrees identified as 50 and measured with respect to a reference azimuth 51. With the receiver and tool positioned as shown in FIG. 3a, the transmitter 16 is fired a first time. The broken curve 70 in FIG. 4b represents conceptually a first arrival full waveform response of the receiver 22 to the first firing of the transmitter 16. The time 68 of the first negative inflection 65 is less than the negative inflection time 64 with the tool centralized. This is because acoustic energy from the transmitter 16 arrives at the receiver 22 sooner as the radial distance between the receiver 22 and the borehole wall 43 is minimized. FIG. 3b is a cross sectional view of the tool 10 eccentered within the borehole 44. The tool 10 has been rotated 180 degrees so that the receiver 22 is now azimuthally positioned at the angle θ+180. With the receiver and tool positioned as shown in FIG. 3b, the transmitter 16 is fired a second time. The solid curve 72 in FIG. 4b represents conceptually a first arrival component of a full waveform response of the receiver 22 to the second firing of the transmitter 16. The time 66 of the first negative inflection 65 is now greater than the negative inflection time 64 with the tool centralized. This is because acoustic energy from the transmitter 16 arrives at the receiver 22 later as the radial distance between the receiver 22 and the borehole wall 43 is maximized.

Azimuthal orientation angles can also be measured with respect to an azimuthal orientation of the transmitter 11. It is noted that in the preferred embodiment shown in FIG. 1, the transmitter 11 and plurality of receivers 22 are azimuthally aligned. In this embodiment, azimuthal orientation angles are essentially identical for both transmitter and the receivers. In an alternate embodiment of the invention, it is preferred to measure azimuthal orientation angles with respect to the azimuthal orientation of the transmitter. One such embodiment, which will be disclosed in a subsequent section, is a wireline embodiment in which the transmitter section rotates with respect to the receiver section.

Figure 4C:
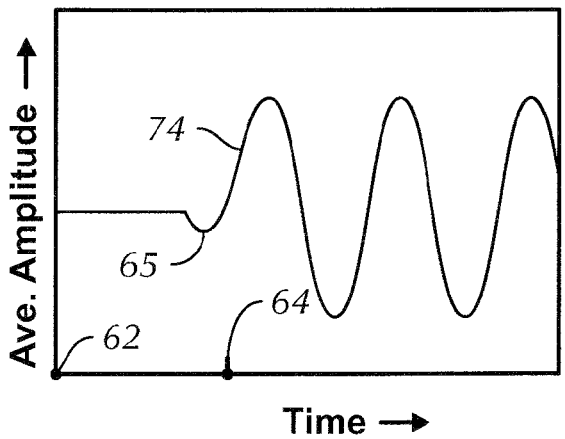
FIG. 4c represents a combination of the above full waveforms illustrating compensation for effects of the tool eccentered in the borehole.

FIG. 4c illustrates a composite full waveform 74, which is an average of curves 70 and 72 depicted in FIG. 4c. The ordinate represents the average amplitude and again the abscissa represents time measured from transmission firing 62. Although the full waveform curve has been broadened somewhat by averaging, the time 64 of the first negative inflection 65 occurs at the same time as the time of first negative inflection with the tool centralized (see FIG. 4a). Alternately the curves 70 and 72 can be summed to form a composite full waveform.

By timing the firing of the transmitter 16 based upon azimuthal positioning of the tool within the borehole, the effects of tool eccentricity can be reduced using a single receiver 22 at a given axial spacing. More specifically, a second transmitter firing occurs when the directional section 24 senses that the tool has rotated 180 degrees from the first transmitter firing. FIGS. 3a and 3b indicate first and second transmitter firings when the receiver-borehole wall radial separation is at a minimum and at a maximum, respectively. These examples were chosen to illustrate the maximum adverse effects caused by tool eccentricity. First and second firings can occur at any time as long as the time interval between the firings corresponds to an azimuthal tool rotation of 180 degrees. As stated previously, waveforms from first and second transmitter firings can be summed as well as averaged. Full waveform data process is typically semblance methodology, which utilizes excursions from each axially spaced receiver, and times related to these excursions rather than absolute amplitudes of the excursions. Furthermore, multiple pairs of composite first and second wave forms, collected over a predetermined sample interval, are subsequently combined. Waveform data collected over the sample interval are typically processed using semblance methods to obtained acoustic parameters of interest, as will be discussed in more detail in the following section directed toward operating results.

Operating Results

The following section discloses modeled responses of the acoustic logging system with a tool of 6.75 inches (17.1 centimeters) in diameter operating in an 8.50 inches (21.6 centimeters) diameter borehole. For purposes of illustrating operation of the system, the receiver section 20 comprises six azimuthally aligned receivers 22 as illustrated in FIG. 1. A greater or lesser number of receivers can be used. The axial spacing between each receiver is 6 inches (15.2 centimeters). The transmitter section comprises a single transmitter 16 which is disposed in the wall of the tool pressure housing 11 and which is azimuthally aligned with the receivers 22. The peripheral region of the tool containing the receiver and transmitter elements is commonly referred to in the art as the "tool face".

Orientation of the tool face is provided by the directional section 24 comprising a magnetometer and/or accelerometer. Orientation data are provided to the tool processor (not shown and preferably disposed within the electronics section 26) every 2 to 3 milliseconds. Software resident in the processor or firmware cooperates with the transmitter 16. Orientation data are in the form of the azimuthal angle θ of the tool face measured with respect to a reference angle 51 (see FIGS. 2a, 2b, 3a and 3b). The transmitter 16 is fired a first time when the tool face is oriented at an angle θ, and fired a second time as the tool face rotates to an angle θ+180 degrees. Sensor responses $S_{i,j}$ induced by the each transmitter firing is measured, where the subscript "i" indicates the receiver (i=1, 2, ..., 6) and the subscript "j" indicates the first or second transmitter firing (j=1, 2). The process is repeated for a sample period T, which typically ranges from 5 to 20 seconds. Receiver responses $S_{i,1}$ and $S_{i,2}$ are summed over the sample period T to yield $S_i(T)$, which is a response from receiver "i" (i=1, 2, ..., 6) which has been compensated for tool eccentricity as previously discussed. The quantities $S_i(T)$ are then combined preferably using semblance to determine compressional and shear velocities of the formation 34 penetrated by the borehole 44.

The response of the logging system was modeled using a formation with compressional slowness of 48 microseconds/foot (157 microseconds/meter) and a shear slowness of 96 microseconds/foot (315 microseconds/meter). The borehole 44 is filled with water with a slowness of 203 microseconds/foot (667 microseconds/meter).

Simulations of the acoustic logging system responses were made with the tool 10 rotating centralized in the borehole 44 as shown in FIGS. 2a and 2b, and with the tool rotating at maximum eccentricity in the borehole as shown in FIGS. 3a and 3b.

Figure 5:
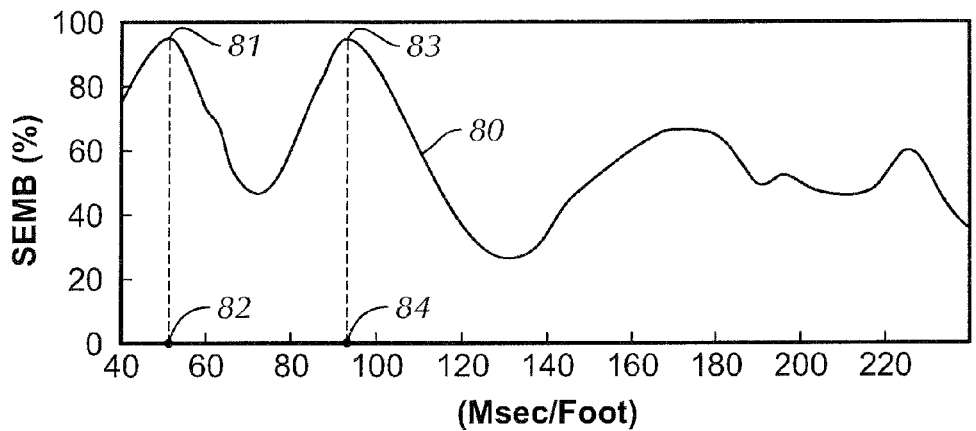
FIG. 5 is a semblance projection plot of the responses of six receivers with the tool centralized in the borehole.

FIG. 5 is a semblance projection plot 80 of the combined sensor responses $S_{i,j}$ from the six receivers 22 (see FIG. 1) plotted as a function of slowness with the tool 10 rotating centralized (see FIGS. 2a and 2b) within the borehole 44. The peak 81 at the compressional slowness 82 of 48 microseconds/foot shows a better than 96 percent coherence. Likewise, the peak 83 at the shear slowness 84 of 96 microseconds/foot shows a better than 96 percent coherence. These are the maximum coherences that can be expected since the tool 10 is operating centralized within the borehole 44.

Figure 6:
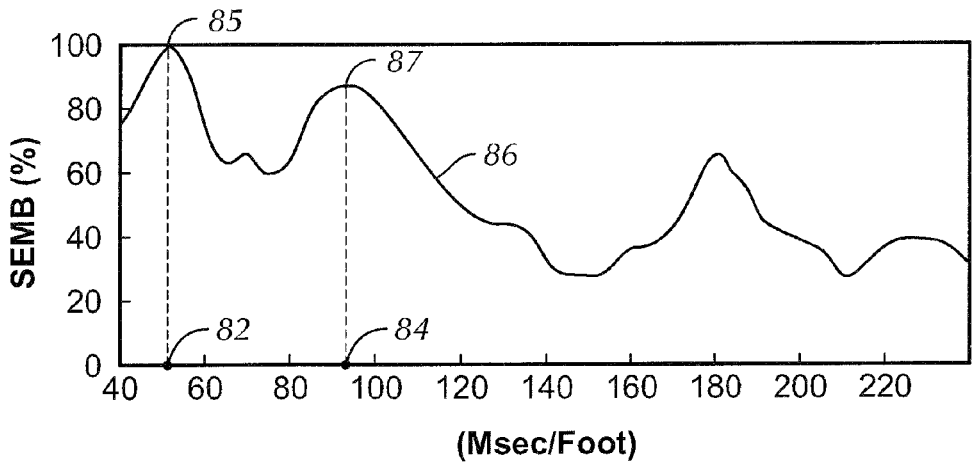
FIG. 6 is a semblance projection plot of the responses of six receivers measured at a single azimuthal angle with the tool eccentered in the borehole.

FIG. 6 is a semblance projection plot 86 of the combined sensor responses $S_{i,j}$ from the six receivers 22 plotted as a function of slowness with the tool 10 rotating eccentered within the borehole 44. Furthermore, the sensor responses $S_{i,j}$ were measured only with the receivers 22 facing the wall 43 of the borehole 44, as illustrated in FIG. 3a. Using previously introduced nomenclature, sensor measurements resulting only from the first firing (j=1) were used in the semblance processing. The peak 85 at the compressional slowness 82 of 48 microseconds/foot shows that the compressional arrival maintained better than 95% coherence. The peak 87 at the shear slowness 84 of 96 microseconds/foot shows that the shear arrival had only 86 percent coherence with a relatively wide projection. This is due to waveform distortion that, in turn, is a result of tool eccentricity within the borehole. Lower shear velocity coherence is expected in larger boreholes.

Figure 7:
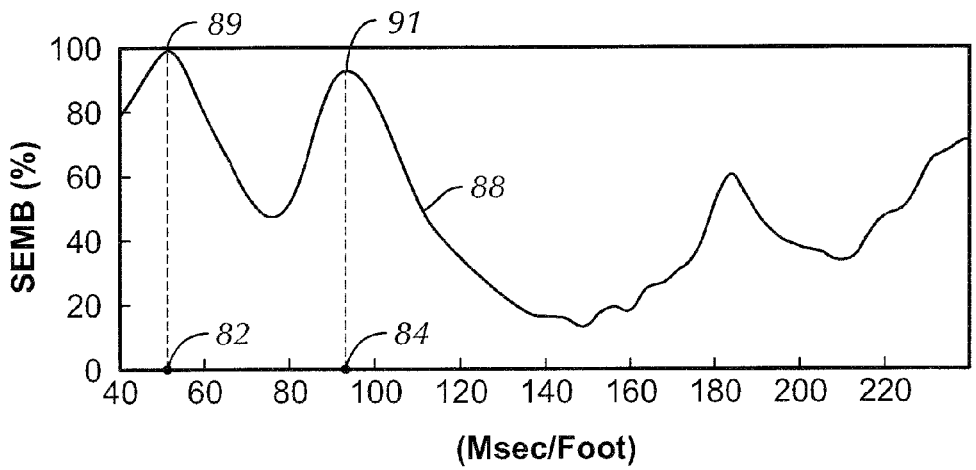
FIG. 7 is a semblance plot of the responses of six receivers measured at opposing azimuthal angles illustrating compensation for tool eccentricity effects.

FIG. 7 is again a semblance projection plot 88 with the tool 10 rotating eccentered within the borehole 44. In this case the transmitter was fired a first and second time as the tool face rotated through an angles θ and θ+180 degrees. The sensor responses $S_{i,j}$ from the six receivers 22 were combined and used to obtain $S_i(T)$ over a 5 second sample period, as previously discussed. The quantities $S_i(T)$ were used in the semblance processing to obtain the curve 88. The peak 89 at the compressional slowness 82 of 48 microseconds/foot again shows that the compressional arrival is maintained better than 95% coherence. The peak 91 at the shear slowness 84 of 96 microseconds/foot shows that the coherence of the shear arrival has increased to better than 95 percent coherence. Even though the tool is rotating at maximum eccentricity within the borehole, the use of the summed quantities $S_i(T)$ essentially compensated for the adverse effects of tool eccentricity. Initial azimuthal angles θ of 30, 60 and 90 degrees were selected. Simulation results showed that regardless of the magnitude of the initial azimuthal orientation angle θ as measured from a reference angle 51 (see FIGS. 2a, 2b, 3a, and 3b), eccentricity compensation was obtained as long as the first and second transmitter firings (and subsequent measures of $S_{i,1}$ and $S_{i,2}$) occurred at angles θ and θ+180 degrees. Furthermore, simulations in boreholes of differing sizes showed similar compensation for tool eccentricity.

Figure 8:
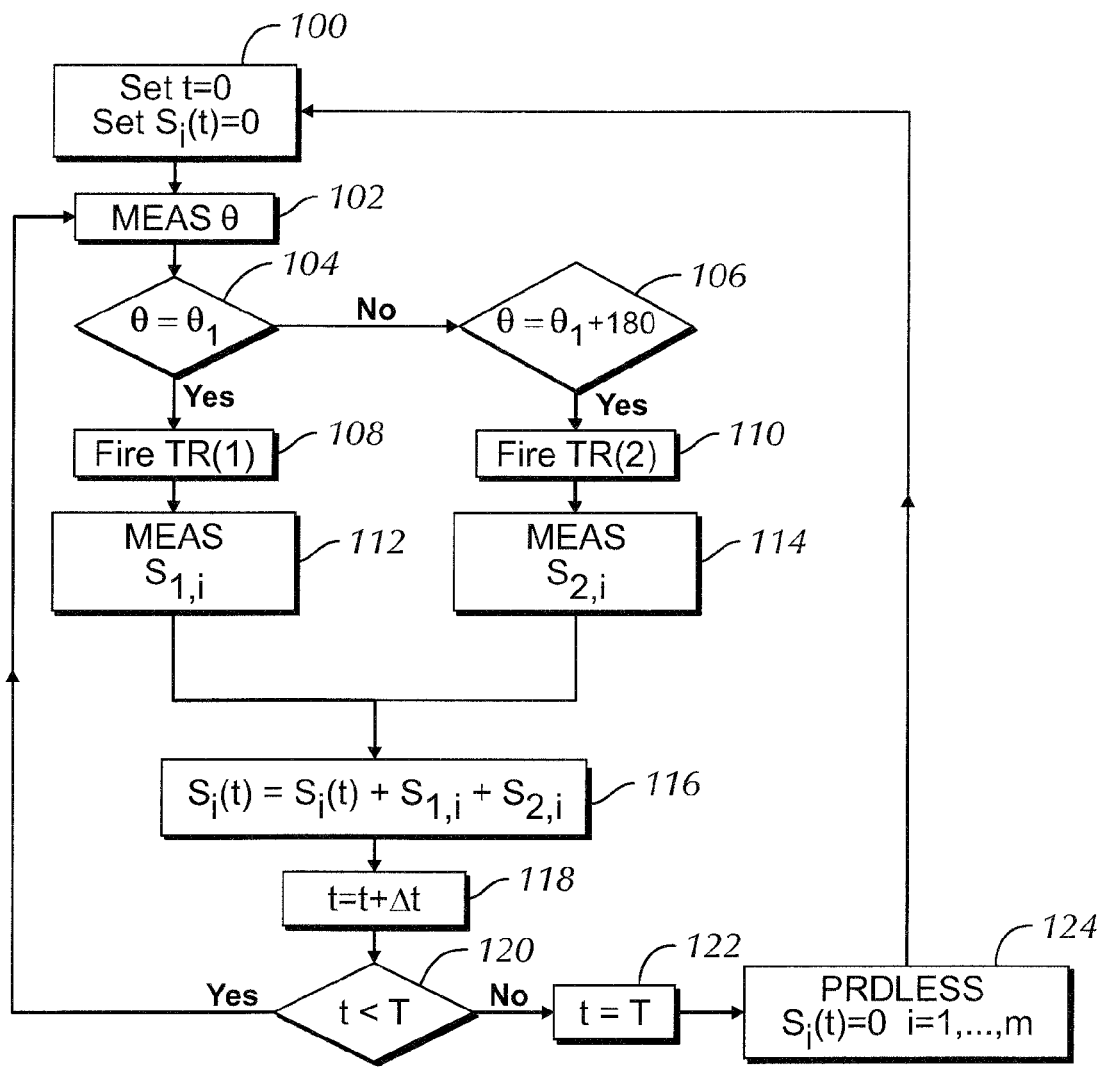
FIG. 8 is a flow chart illustrating data processing methodology.

Data processing is illustrated conceptually in FIG. 8. The nomenclature is summarized below.

$S_{j,i}$=the response of the $i^{th}$ receiver induced by the $j^{th}$ transmitter firing;

n=the number of receivers (i=1, 2, ... n);

$θ_1$=the azimuthal angle of the first transmitter firing;

T=the sample period;

t=time, where t ranges from 0 to T; and

DT=the time required for the receiver to rotate from angle $θ_1$ to angle $θ_1$+180 degrees;

Both t and $S_i(t)$ are set to zero at 100. Azimuthal orientation θ of the tool is measured at 102. If the measured angle θ is equal to $θ_1$, the transmitter is fired a first time at 108 and responses $S_{1,i}$ to this first transmitter firing are measured at 112. If the measured angle θ is not equal to equal to $θ_1$ and not equal to $θ_1$+180 degrees (as determined at 106), then the angle θ is again measured at 102. If the measured angle θ is equal to equal to $θ_1$+180 degrees (as determined at 106), the transmitter is fired for a second time at 110 and responses $S_{2,i}$ to this second transmitter firing are measured at 114. The values of $S_{1,i}$ and $S_{2,i}$ are added to the cumulative sum $S_i(t)$ at 116. Time t is incremented at 118 by ΔT. If t is less than T as determined at 120, processing is returned to 102 for another measure of θ. If t is equal to or greater than the sample period T, then t is set equal to T at 122. The cumulative sums of responses $S_i(T)$ of the n receivers for the sample period T are combined at 124 preferably using semblance techniques to determine the desired parameters of interest (e.g. compressional and shear slowness) of the measured waveforms. Processing then returns to step 100, and the process is repeated as the tool 10 is conveyed along the borehole. It should be understood that the FIG. 8 illustrates one means for processing measured data, but other means can be effectively use to obtain similar results.

Alternate Embodiments

Figure 9:
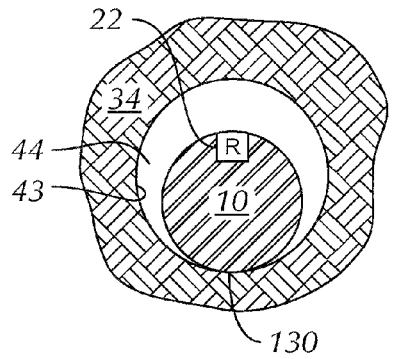
FIG. 9 is a cross section view illustrating concepts of an alternate embodiment using a single transmitter firing per tool revolution.

As discussed previously, optimal acoustic measurements are typically obtained when acoustic receivers are centered within the borehole. Since receivers of LWD tools are typically disposed within the wall of a drill collar, the receivers tend to be more centralized when the collar abuts the borehole wall and the receiver is on the opposite side of the point of abutment. In deviated drilling operations, the tool is typically abutting the low or "bottom" side of the borehole, and optimal centralization is obtained when the receiver faces the opposite or "top" side of the borehole. Such a condition is illustrated as a cross sectional view in FIG. 9. The tool 10 is eccentered in the borehole 44 and abuts the borehole wall 43 at 130. Assuming that the borehole is deviated, the tool is resting on the bottom side of the borehole. The receiver 22 is optimally centralized when tool face is azimuthally facing the top side of the borehole. Some compensation for borehole eccentricity can be obtained by firing the transmitter and recording resulting receiver response only when the directional section 24 senses that the tool face is facing the top side of the borehole 44. In this alternate embodiment of the invention, only one firing of the transmitter per revolution of the tool is required to obtain this partial eccentricity compensation. It should be understood that the tool need not be fired specifically as it rotates by the "top" side of the borehole. In some cases such as in boreholes of oval cross sections, maximum centralization is obtained with "offset" firings depending upon the orientations of the major and minor axes of the borehole cross section.

Figure 10:
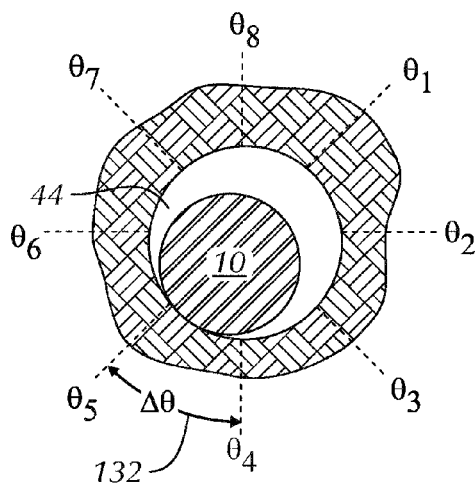
FIG. 10 is a cross sectional view illustrating an alternate embodiment using more than two transmitter firings, as a function of tool azimuthal angle, per tool revolution.

The transmitter can be fired as a function of more than two tool azimuthal orientations as the tool rotates within the borehole. This alternate embodiment of the acoustic logging system is illustrated conceptually in the cross sectional view shown in FIG. 10. Referring also to FIG. 1, the transmitter 16 is fired as the directional package 24 senses that the tool 10 has rotated through an azimuthal angle Δθ shown at 132. That is, the transmitter is fired at each angle $\theta_p$ (p=, 1, 2, ..., q) as the tool 10 rotates within the borehole 44. For purposes of illustration, eight firings per revolution are shown (q=8). The previously defined composite signal $S_i(t)$ is obtained by summing q receiver responses measured at time intervals $\theta_p$ (p=1, 2, ..., q) for each axially spaced receiver i comprising the receiver section 20. Compensation for tool eccentricity is obtained by the composite signal averaging effect discussed in the preferred system embodiment using two firings per revolution.

Figure 11:
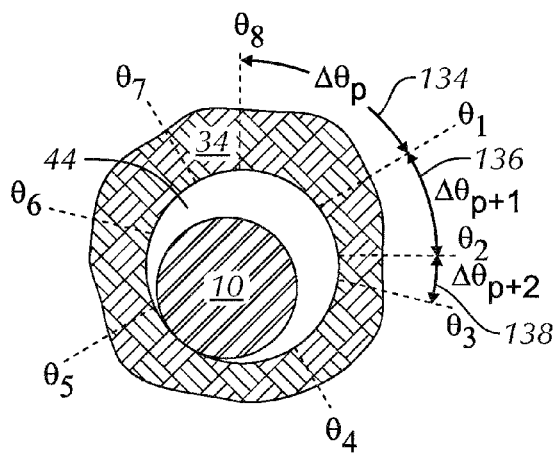
FIG. 11 is a cross sectional view illustrating an alternate embodiment and using more than two transmitter firings, as a function of time, per tool revolution.

Transmitter firings can be a function of time rather than a function of azimuthal orientation of the tool face, given that the rotational speed is constant or periodically supplied by an independent measurement from a rotational speed sensor. The rotational speed sensor can comprise a clock (not shown) disposed within the electronics section 26 cooperating with the directional package 24 (see FIG. 1) to obtain a measure of rotational speed downhole. Alternately, a rotational speed sensor can cooperate with the drilling rig 36 to obtain an independent measure of rotational speed at the surface 46 of the earth. This surface measurement would then be telemetered to the tool 10 to control firing of the transmitter 16 at azimuthal orientations determined as a function of time. This alternate embodiment of the acoustic logging system is illustrated conceptually in the cross sectional view shown in FIG. 11. Referring again to FIG. 1, the directional section 24 cooperating with the clock in the electronics section 26 preferably measures the time required for the tool 10 to rotate 360 degrees. This time is then divided into equal time increments $\Delta t_p$. Again for purposes of illustration, eight time intervals are used in FIG. 11. Each time increment is preferably about 50 milliseconds. The transmitter 16 is fired every time increment $\Delta t_p$. Stated another way, the transmitter 16 is fired at an azimuthal orientation which is determined as a function of the response of rotational speed sensor. Using nomenclature of previously discussed firings as a function of tool face azimuthal orientation, the transmitter is fired at corresponding angles $\theta_p$ (p=, 1, 2, ..., q) as the tool 10 rotates within the borehole 44. The rotational speed sensor measurement senses if the tool 10 does not rotate at a constant rotational velocity within the borehole 44. Transmitter firings then occur at different differential orientations angles $\Delta\theta_p$ (p=, 1, 2, ..., q) as illustrated with examples at 134, 136, and 138. Once again, the previously defined composite signal $S_i(t)$ is obtained by summing q receiver responses measured at time intervals $\Delta t_p$ (p=1, 2, ..., q) for each axially spaced receiver i comprising the receiver section 20. Compensation for tool eccentricity is again obtained by the signal averaging effect discussed in the preferred system embodiment using two firings per revolution. Although discussed in terms of the LWD embodiment shown in FIG. 1, the time based embodiment is also applicable to systems using other means for tool conveyance.

Figure 12:
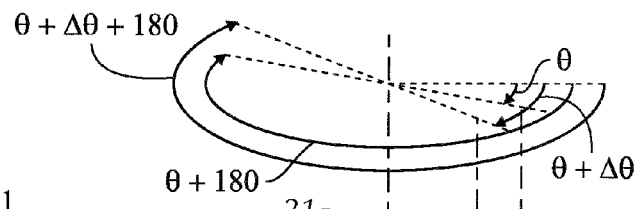
FIG. 12 illustrates an alternate embodiment of the receiver section with receivers azimuthally staggered.

The preferred embodiment shown in FIG. 1 illustrates six receivers 22 azimuthally aligned along the perimeter of the receiver section 20, which is typically a drill collar with a conduit 21 through which drilling fluid flows. For structural or other reasons, it may be advantageous to slightly stagger the receivers. FIG. 12 shows the six receivers, with three receivers 22a being azimuthally aligned at an angle θ and three receivers azimuthally aligned at an angle θ+Δθ. With the receivers staggered as shown in FIG. 12, it is preferred that the transmitter be fired at a first firing set at angles θ and θ+Δθ degrees, and fired at a second firing set at angles θ+180 and θ+Δθ+180 degrees. The composite sum $S_i(t)$ is obtained by summing, for each axially spaced receiver i, responses of receivers 22a measured θ and θ+180 degrees with responses of receivers 22b measured at θ+Δθ and θ+Δθ+180 degrees. Compensation for tool eccentricity is once again obtained by the signal averaging effect discussed in the preferred system embodiment using two firings per revolution at angles θ and θ+Δθ. It is noted that the "angle of stagger" is typically small and in the range of 5 to 10 degrees.

Basic concepts of the invention are applicable to types of logging systems other than LWD systems. More specifically, the basic concepts are applicable to logging systems in which the logging tool is not rotated by a drill string. These systems include wireline conveyed, tubing conveyed, slick line conveyed, and pump down systems. As mentioned previously in discussing wireline acoustic logging systems, receivers are typically centralized within a receiver section of the logging tool. Certain borehole conditions, such as borehole restrictions, can negate the use of mechanical centralizers on wireline tools thereby inducing eccentricity errors. The adverse effects of tool eccentricity are minimized by using a rotating, directional transmitter cooperating with a non-rotating receiver section. The transmitter is rotated by cooperating motor within the logging tool. Using signals from a cooperating directional package or clock within the tool, the receiver is fired as it rotates through one or more predetermined azimuthal orientations. Using the example of the preferred LWD embodiment as an analogy, the transmitter is fired as it rotates through angles θ and θ+Δθ. Receiver responses resulting from each firing are measured over a sample period T, and the previously defined composite signals $S_i(T)$ are obtained by summing receiver responses at angles $\theta$ and $\theta+\Delta\theta$ for each axially spaced receiver in the receiver section. Compensation for any tool eccentricity is again obtained by the composite signal averaging effects discussed previously.

Additional variations of the embodiment of the invention will be apparent to those skilled in the art. It should also be apparent to those skilled in the art that borehole measurements, other than acoustic, that are adversely affected by tool eccentricity can likewise be compensated by making a plurality of measurement at least two known azimuthal orientations. These two or more measurements are then combining to form a composite, compensated measurement using methodology taught in this disclosure.

The above disclosure is to be regarded as illustrative and not restrictive, and the invention is limited only by the claims that follow.

What is claimed is:

1. An acoustic tool with response compensated for tool eccentricity within a borehole, the tool comprising:
   (a) an acoustic transmitter; and
   (b) an acoustic receiver axially spaced from said transmitter; wherein
   (c) said transmitter is fired as a function of azimuthal orientation of said transmitter within said borehole thereby generating said response in said receiver; and
   (d) said response is compensated for borehole eccentricity by selection of said azimuthal orientation.

2. The tool of claim 1 further comprising a directional package wherein said azimuthal orientation is determined from a response of said directional package.

3. The tool of claim 2 further comprising a processor, wherein:
   (a) during a revolution of said tool, said transmitter is fired a plurality of times as a function of a plurality of said azimuthal orientations; and
   (b) responses of said receiver to each of said plurality of transmitter firings are combined to yield a composite transmitter response compensated for said eccentricity of said tool within said borehole.

4. The tool of claim 3 wherein:
   (a) said transmitter is first fired as a function of a first azimuthal orientation of said transmitter and second fired as a function of a second azimuthal orientation of said transmitter; and
   (b) responses of said receiver to said first fire and said second fire of said transmitter are combined to yield said composite transmitter response compensated for eccentricity of said tool within said borehole.

5. The tool of claim 4 wherein said first azimuthal orient differs from said second azimuthal orientation by an angle of 180 degrees.

6. The tool of claim 1 further comprising a rotational speed sensor wherein said azimuthal orientation is determined as a function of a response of said rotational speed sensor.

7. The tool of claim 6 wherein said rotational speed sensor comprises a clock cooperating with a directional package.

8. The tool of claim 7 wherein said transmitter is fired at azimuthal orientations defined by a response of said directional package combined with equal time increments measured by said clock.

9. The tool of claim 1 wherein said tool is conveyed along said borehole with a drill string.

10. A LWD acoustic logging system with response compensated for tool eccentricity within a borehole, the system comprising:
   (a) a tool housing comprising
      a transmitter section comprising an acoustic transmitter,
      a receiver section comprising a plurality of acoustic receivers wherein the receivers are disposed at a plurality of axial spacings from said transmitter, and
      a directional package; wherein
   (b) said directional package measures azimuthal orientation angle of said tool within a borehole; and
   (c) during a revolution of said tool, said transmitter is fired as a function at least one said azimuthal orientation angle wherein
      said receivers respond to said transmitter firing at said at least one azimuthal orientation angle, and
      said at least one azimuthal orientation angle is selected to compensate for said tool eccentricity.

11. The system of claim 10 wherein:
   (a) said tool housing comprises a drill collar;
   (b) said drill collar is affixed to a drill string;
   (c) said tool is rotated within said borehole by said drill string; and
   (d) said receivers comprising said receiver section are azimuthally aligned on the perimeter of said drill collar.

12. The system of claim 11 wherein:
   (a) said transmitter is first fired as a function of a first azimuthal orientation angle of said tool and second fired as a function of a second azimuthal orientation angle of said tool, wherein said first and second azimuthal orientation angles differ by 180 degrees; and
   (b) responses of each said receiver to said first firing and said second firing of said transmitter are combined to yield a composite receiver response for that receiver over a predetermined sample time.

13. The system of claim 12 further comprising a processor in which said composite receiver responses are combined using semblance techniques to determine an acoustic property of formation penetrated by said borehole.

14. A method for compensating a borehole acoustic measurement for tool eccentricity, the method comprising the steps of:
   (a) disposing an acoustic transmitter within said tool;
   (b) within said tool, axially spacing an acoustic receiver from said transmitter;
   (c) determining azimuthal orientation of said transmitter within said borehole
   (d) firing said transmitter as a function of at least one said azimuthal orientation of said transmitter within said borehole;
   (e) determining said acoustic measurement from at least one response of said receiver to said at least one transmitter firing; and
   (f) selecting said at least one azimuthal orientation for said at least one transmitter firing to compensate said acoustic measurement for said tool eccentricity.

15. The method of claim 14 further comprising:
   (a) disposing a directional package within said tool; and
   (b) determining said azimuthal orientation from a response of said directional package.

16. The method of claim 15 further comprising:
   (a) during a revolution of said tool, firing said transmitter a plurality of times as a function of a plurality of said azimuthal orientations; and
   (b) combining responses of said receiver to each of said plurality of transmitter firings to obtain a composite transmitter response compensated for said tool eccentricity.

17. The method of claim 16 further comprising:
(a) firing said transmitter a first time as a function of a first azimuthal orientation of said transmitter and firing said transmitter a second time as a function of a second azimuthal orientation of said transmitter; and
(b) combining responses of said receiver to said first fire and said second fire of said transmitter to obtain said composite transmitter response compensated for said tool eccentricity.

18. The method of claim 17 wherein said first azimuthal orientation differs from said second azimuthal orientation by an angle of 180 degrees.

19. The method of claim 14 further comprising determining said azimuthal orientation as a function of a rotational speed sensor response.

20. The method of claim 19 further comprising determining said rotational speed sensor response by combining measurements of a clock cooperating with a response of a directional package.

21. The method of claim 20 further comprising firing said transmitter at azimuthal orientations defined by said response of said directional package combined with equal time increments measured by said clock.

22. The method of claim 14 further comprising conveying said tool along said borehole with a drill string.

23. A LWD acoustic logging method with a response compensated for tool eccentricity, the method comprising:
(a) providing a tool housing and disposing therein
  a transmitter section comprising an acoustic transmitter,
  a receiver section comprising a plurality of acoustic receivers wherein the receivers are disposed at a plurality of axial spacings from said transmitter, and a directional package;
(b) measuring at least one azimuthal orientation angle of said tool within a borehole;
(c) during a revolution of said tool, firing said transmitter as a function of said at least one azimuthal orientation angle, wherein each said receiver responds to said transmitter firing at said at least one azimuthal orientation angle; and
(d) selecting said at least one azimuthal orientation angle to compensate said receiver response for said tool eccentricity.

24. The method of claim 23 further comprising:
(a) utilizing a drill collar as said tool housing;
(b) azimuthally aligning said plurality of receivers on the perimeter of said drill collar;
(c) affixing said drill collar to a drill string; and
(d) rotating said tool within said borehole with said drill string.

25. The method of claim 24 further comprising:
(a) initiating a first firing of said transmitter as a function of a first azimuthal orientation angle of said tool and initiating a second firing of said transmitter as a function of a second azimuthal orientation angle of said tool, wherein said first and second azimuthal orientation angles differ by 180 degrees; and
(b) combining responses of each said receiver to said first transmitter firing and said second transmitter firing to yield a composite receiver response for that receiver over a predetermined sample time so that each of said composite receiver responses is compensated for said tool eccentricity within said borehole.

26. The method of claim 25 further comprising combining said composite responses using semblance techniques to determine an acoustic property of formation penetrated by said borehole.

* * * * *